United States Patent [19]

Mori

[11] 4,361,629
[45] Nov. 30, 1982

[54] BEARING MATERIAL AND METHOD OF PRODUCING SAME

[75] Inventor: Sanae Mori, Nagoya, Japan

[73] Assignee: Daido Metal Company Ltd., Nagoya, Japan

[21] Appl. No.: 167,589

[22] Filed: Jul. 11, 1980

[51] Int. Cl.³ .............................................. B22F 3/00
[52] U.S. Cl. .................................... 428/553; 428/557; 308/237 R; 29/149.5 PM; 75/201; 75/208 CS; 75/231
[58] Field of Search ............... 29/149.5 PM; 308/237; 428/553, 557; 75/201, 208 R, 208 CS, 231

[56] References Cited

U.S. PATENT DOCUMENTS

| | | | |
|---|---|---|---|
| 2,815,567 | 12/1957 | Gould et al. | 29/420 |
| 3,104,135 | 9/1963 | Morrison et al. | 308/237 |
| 3,221,392 | 12/1965 | Gould et al. | 29/149.5 |
| 3,445,909 | 5/1969 | Beebe | 29/149.5 |
| 3,797,084 | 3/1974 | Fedor et al. | 29/149.5 PM |
| 3,812,563 | 5/1974 | Toaz | 29/149.5 |
| 4,121,928 | 10/1978 | Mori | 75/208 CS |
| 4,170,469 | 10/1979 | Mori | 75/208 CS |
| 4,189,522 | 2/1980 | Mori | 75/231 |

OTHER PUBLICATIONS

Hirschhorn, J., *Introduction to Powder Metallurgy*, (1969), APMI, N.Y., N.Y., p. 325.

Primary Examiner—Brooks H. Hunt
Attorney, Agent, or Firm—Karl W. Flocks; Sheridan Neimark

[57] ABSTRACT

Bearing material including aluminum as its main ingredient and at least one lubricant additive, produced by compacting a powder material including aluminum as its main ingredient and at least one lubricant additive into a desired shape, subjecting the compacted and shaped powder material to heat treatment, extruding the heat-treated material and then subjecting the extruded material to heat treatment.

The bearing material thus formed has a structure in which the lubricant additives are uniformly distributed as fine particles of small size, and also has a high percentage of elongation.

12 Claims, 22 Drawing Figures

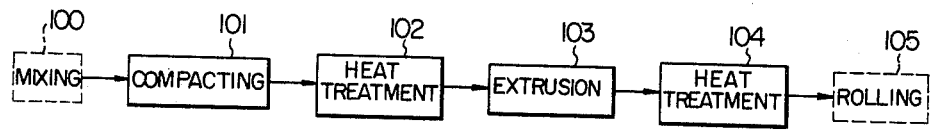
FIG. 1
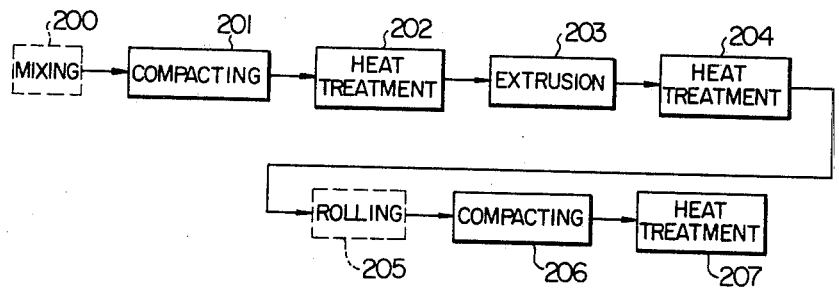
FIG. 2
FIG. 3
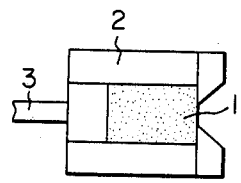
FIG. 4
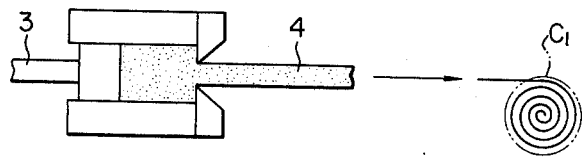
FIG. 5
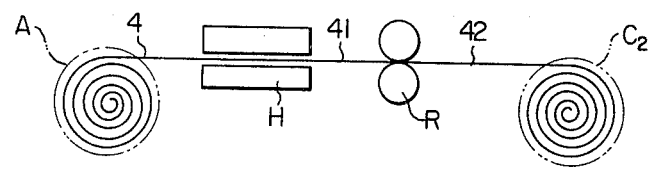

×100

×100

×100

×100

BEARING MATERIAL AND METHOD OF PRODUCING SAME

BACKGROUND OF THE INVENTION

1. Field of the Invention

This invention relates to bearing material and a method of producing same.

2. Description of the Prior Art

The inventor has carried out research on multi-layer bearing material and a method of producing same and have developed inventions disclosed in U.S. patent specification No. 4,189,522 and U.S. patent specification No. 4,121,928 (Japanese Patent Publication No. 2441/80).

The multi-layer bearing material provided by these inventions is produced by supplying powder to a steel strip, pressing the powder and the steel strip by rolls to provide a bond therebetween, and then subjecting the multi-layer material to sintering. The inventions disclosed in these patents involve the use of the art of rolling the powder into a two or three layer composite bearing. It has since been revealed that difficulties are encountered in controlling the thickness of the supplied powder when the methods provided by the patents are used. Also, it has since been revealed that as the thickness of the powder layers increases, cracks are liable to be formed at the end portions of the layers of powder obtained by rolling. Thus when the methods provided by the patents are used difficulties are experienced in producing bearing material of large thickness, and the bearing materials produced by such methods are low in percentage of elongation which greatly affects toughness and fatigue strength of all the mechanical properties essential to bearing material to enable the bearings to give the best performance. The present invention provides a solution to these problems encountered in carrying the methods of the prior art into practice.

SUMMARY OF THE INVENTION

An object of this invention is to provide a method of producing bearing material enabling bearing material of large thickness to be readily produced.

Another object is to provide bearing material and a method of producing same having its percentage of elongation enormously increased as compared with bearing material of the prior art.

Still another object is to provide a method of economically producing material including the process step of extrusion of metal powder.

A further object is to provide novel and useful bearing material which is suitable for use as antifriction material for producing sliding members, such as bearing bushes, shoes, slide plates, and sliding members used in clutches, brakes, etc., and collectors.

BRIEF DESCRIPTION OF THE DRAWINGS

FIGS. 1 and 2 are block diagrams showing the sequence of process steps followed in producing bearing material by the method according to the invention;

FIGS. 3-9 are schematic views explaining the principle of the method according to the invention for producing bearing material in a plant, showing the process steps in detail;

DESCRIPTION OF THE PREFERRED EMBODIMENTS

Figure 6:
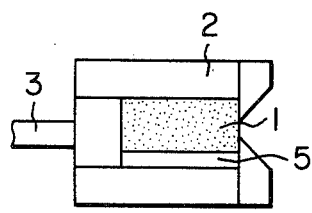
Figure 7:
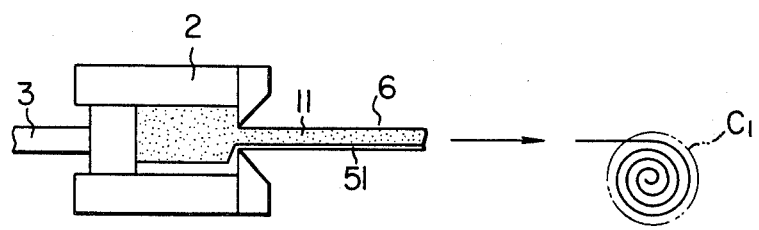
Figure 8:
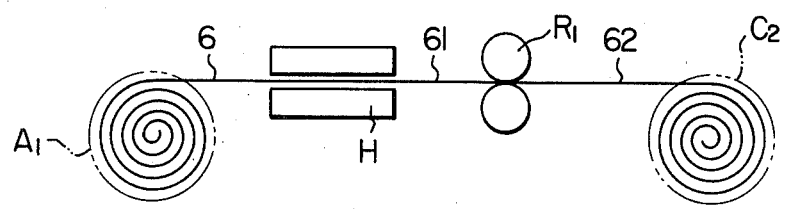

The bearing material and the method of producing same according to the invention will be described by referring to the examples shown in the drawings.

EXAMPLE 1

FIG. 1 is a block diagram of the process steps followed in producing single material bearing according to the invention comprising mixing of the powder 100, compacting the powder into a shape 101, heat treatment 102, extrusion 103, heat treatment 104 and rolling 105. The rolling step 105 is not essential but optional, such step being followed to give finishing to the product when dimensional accuracy is a primary requirement. The process steps shown in FIG. 1 will be better understood when reference is made to the schematic views of FIGS. 3-5 in explanation of the principle of the method according to the invention. In following these process steps, various kinds of powder of specimens 1-15 shown in the table at the end of the specification are mixed to provide a powder mixture which is compacted into a desired shape under a pressure of 1.5-2.5 ton/cm$^2$. Then the shaped powder material is subjected to heat treatment at a temperature below which the solidification of an alluminum alloy takes place, such as 350° C., for four hours. Thereafter, the heat-treated, shaped powder material 1 is charged into a container 2 (See FIG. 3). Extrusion of the material is effected by using an extrusion ram 3 under a pressure of 2-3 ton/cm$^2$ (See FIG. 4). The extrusion ratio is 10:1 to 15:1 (or the reduction of area is 1/10 to 1/15). The extruded material 4 is taken up on a coiler C$_1$ (See FIG. 4). The material 4 is then payed out of the coiler C$_1$ by means of an uncoiler A and passed through a heat-treating furnace H, to be subjected to heat treatment at a temperature below the temperature at which solidification of an aluminum alloy starts, such as 350° C., for four hours. The heat-treated, extruded material 41 is fed between a pair of rolls R of a rolling mill to provide a strip of material 42 having had its thickness reduced by rolling to a predetermined level which is taken up on another coiler C$_2$ (See FIG. 5).

Figure 10:
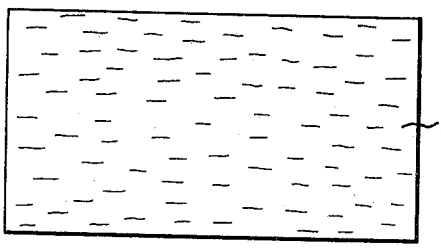
FIGS. 10-13 are sectional views for schematic illustration of the structures of various forms of bearing material according to the invention, showing the bearing material in cross sections obtained by cutting the bearing material in strip form parallel to its lengthwise, namely, the rolling direction.
Figure 17:
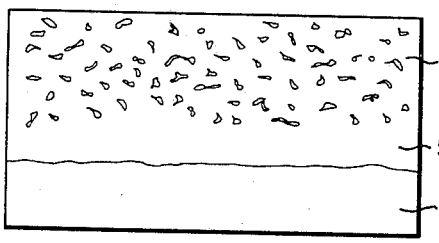
FIGS. 17 and 18 are models showing in section the structures of the bearing material produced by the method provided by the invention (U.S. Pat. No. 4,121,928) of a prior application, showing the bearing material in cross sections obtained by cutting the material in strip form parallel to its direction of rolling.
Figure 18:
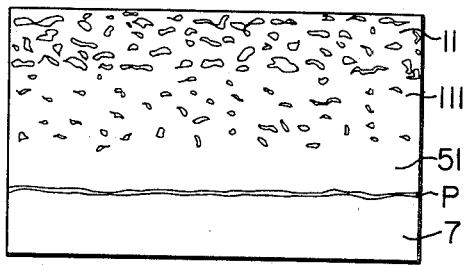
Figure 14:
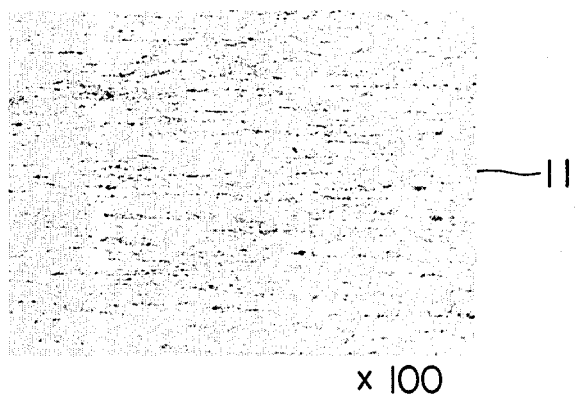
FIGS. 14-16 are micrographs (100×) of various forms of bearing material according to the invention, showing the bearing material in cross sections obtained by cutting the bearing material in strip form parallel to the direction of rolling thereof.
Figure 19:
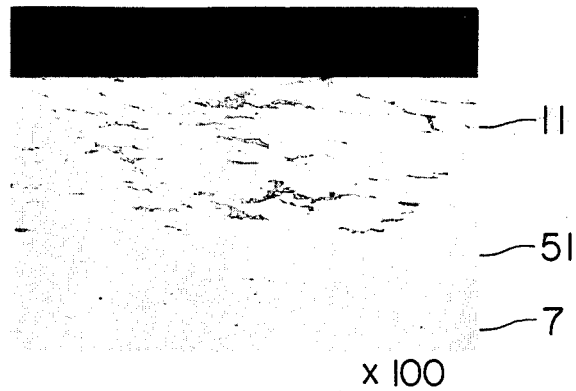
FIG. 19 is a micrograph (100×) of the structure of the bearing material provided by the method according to the invention of the prior application.

FIG. 10 shows a typical model of the material 42 in a sectional view obtained by cutting the material 42 in a direction parallel to the direction of rolling of the material 41, and FIG. 14 is a microphotograph (100×) of the structure of the material 42. For comparison, models of the structures of the bearing material provided by U.S. Pat. No. 4,121,928 and 4,189,522 which disclose inventions of the prior applications shown in sections obtained by cutting the material parallel to the direction of rolling are shown in FIGS. 17 and 18, and a typical optical micrograph thereof is shown in FIG. 19. As can be clearly seen in these figures, the bearing material according to the present invention has its additives distributed more uniformly in particles of smaller size than the bearing material provided by the inventions of the prior applications.

By referring to the table shown at the end of the specification, the mechanical properties of the bearing material according to the present invention that has the same composition as the bearing material of the inventions of the prior applications will be discussed. It will be seen in the table that specimen No. 4 of the bearing material according to the present invention is higher in percentage of elongation, in particular, than specimen No. 16 of the invention of the prior application having almost the same chemical composition as that of No. 4. It will also be seen that specimens 1–3 and 5–15 of the bearing material according to the present invention have improved percentage of elongation as compared with a specimen of the same composition of the invention of the prior application.

In this example, the powder material used includes, a binary alloy of Sn-Pb prepared by pre-alloying or in the form of a powder mixture, a ternary alloy of Cu-Si-Al prepared in the same manner, a quarternary alloy of Cu-Si-Zn-Al prepared in the same manner, solid lubricants such as graphite powder, $MoS_2$ powder, PbO powder, $PbF_2$ powder, $WS_2$ powder and polyimide powder. Also in this example, the coiler $C_1$ and uncoiler A shown in FIGS. 4 and 5, respectively, may, of course, be dispensed with so that the extruded material is continuously supplied to the heat-treating furnace H. This also applies to Example 2 presently to be described.

EXAMPLE 2

FIG. 2 shows in a block diagram of the process steps followed in producing multi-layer bearing material according to the invention. The process steps include mixing of the powder 200, compacting the powder into a shape 201, heat treatment 202, extrusion 203, heat treatment 204, rolling 205, pressure bonding 206 and heat treatment 207.

Referring to FIGS. 6–9 in which the principle of the method according to the invention for producing bearing material in a plant is shown, the heat-treated, shaped powder material 1 (compacted powder) obtained as explained by referring to Example 1 and a bonding layer material 5 (selected from the group consisting of a pure aluminum plate or a material obtained by compacting pure aluminum powder into a desired shape, a heat-treated shaped powder material (compacted powder) having a lubricant additive content lower in proportion than the lubricant additive content of the material 1, or a cast or cast and rolled material stock of a composition corresponding to the composition of the compacted powder material 1 are superposed one over the other and charged into a container 2 (See FIG. 6) and extruded by using an extrusion ram 3 under a pressure of 2–3 ton/cm$^2$ with an extrusion ratio of 10:1 to 15:1 (or a reduction of area of 1/10 to 1/15), to provide an extruded composite material 6 consisting of a plurality of layers 11 and 51 forming a bimetal strip. The composite material 6 is taken up on a coiler $C_1$ (See FIG. 7).

The composite material 6 wound on the coiler $C_1$ is payed out by means of an uncoiler A and passed through a heat-treating furnace H, to be subjected to heat treatment at a temperature below the temperature at which solidification of an aluminum alloy takes place, such as 350° C., for four hours. The heat-treated, composite material 61 is fed between a pair of rolls of a rolling mill $R_1$ to provide a strip of composite material 62 having had its thickness reduced by rolling to a predetermined level which is taken up on another coiler $C_2$ (See FIG. 8).

Figure 9:
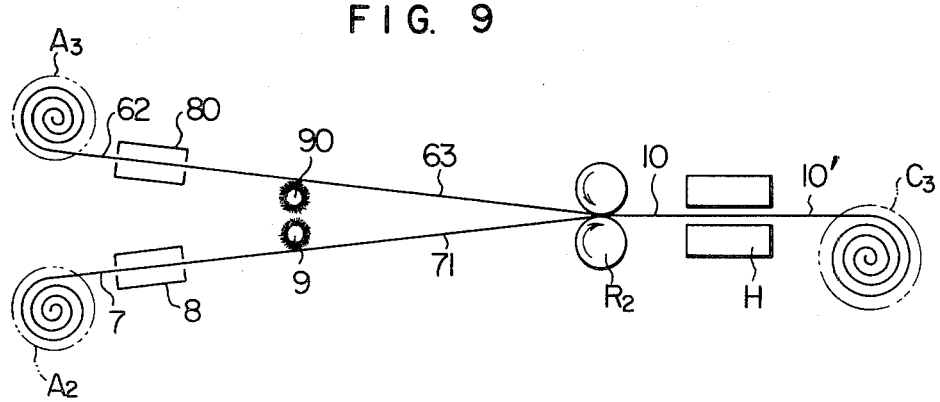

By referring to FIG. 9, the step of bonding under pressure the composite material 62 wound on the coiler $C_2$ to a steel strip 7 and the step of subjecting the bonded material to heat treatment will now be described. An uncoiler $A_2$ has wound thereon the steel strip 7 of low carbon steel. The steel strip 7 is payed out of the uncoiler $A_2$ and passed through a degreasing tank 8 wherein the steel strip 7 is exposed to trichloroethylene gas to have its surfaces cleaned. Then the steel strip 7 has its surface to be bonded is polished by means of a wire brush 9. Another uncoiler $A_3$ has the composite material 62 wound thereon which is payed out of the uncoiler $A_3$ and passed through a degreasing tank 80 wherein the composite material 62 is exposed to trichloroethylene gas to have its surfaces degreased. Then the composite material 62 has its surface to be bonded is polished by means of a wire brush 90. The surface-treated steel strip 71 has the surface-treated composite material 63 superposed thereon are fed between a pair of rolls of a rolling mill $R_2$ wherein pressure is applied to the composite material 63 and strip 71 to bond them together to provide a bonded material 10 of the predetermined dimensions by rolling with a rolling reduction rate of 30–50%.

The bonded material 10 is subjected to heat treatment in a heat-treating furnace H in order to strengthen the bond between the composite material 63 and steel strip 71. Conditions of heat treatment or the temperature and time may vary depending on the powder material used. However, the temperature at which heat treatment of the bonded material 10 is effected is preferably between 200° and 520° C. in order to inhibit the formation of brittle intermetallic compounds of Al-Fe. The heat-treated, composite material 10' is wound on a coiler $C_3$.

Figure 12:
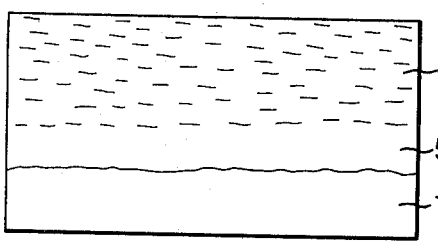
Figure 15:
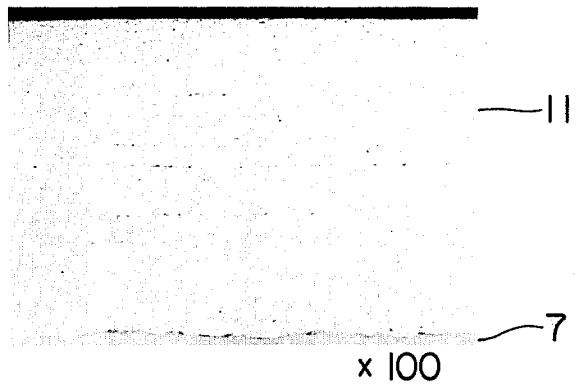
Figure 16:
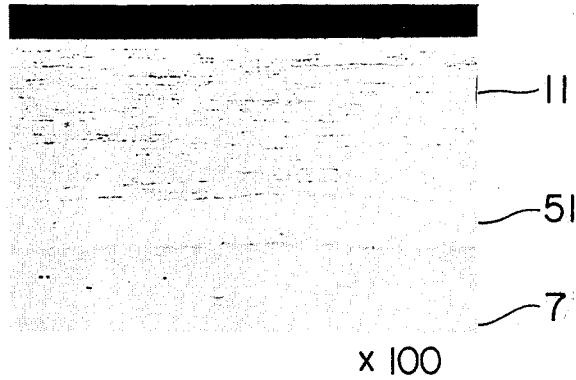

FIG. 12 shows in a model the typical structure of the composite material 10'. FIGS. 15 and 16 are optical micrographs (100×) of the structures of the composite material 10', the structure shown in FIG. 15 having a lower lubricant additive content and the structure shown in FIG. 16 having a higher lubricant additive content. The bearing material 11 produced by following the process steps described hereinabove has its lubricant additives distributed uniformly as fine particles in the entire structure, as is the case with the structure of the bearing material described by referring to Example 1. The percentage of elongation of the bearing material 11 was much higher than that of each of the inventions of the prior applications.

The invention has been described in concrete form by referring to Examples 1 and 2. Various matters to which attention should be paid in carrying the invention into practice will hereinafter be described item by item, so that the features of the invention can be clearly understood.

(1) Shaping of the powder material charged into the container may be carried out readily by using a hydraulic press and a metallic mold. However, shaping may be effected by utilizing hydrostatic pressure to obtain bearing material of large length.

(2) Heat treatment of the compacted material is an important step in the method according to the invention. The heat treatment which is effected following the step of compacting the powder material into the desired shape is essential for avoiding the formation of defective material. More specifically, if this heat treatment step were dispensed with, cracks would be formed in the material in the next following step of extrusion or swelling would occur in the extruded material, thereby lowering the percentage of elongation of the extruded material. The heat treatment has the effect of strengthening the bond between the particles of the compacted powder material, thereby obviating the aforesaid disadvantages. If strengthening of the bond between the particles is the sole object of heat treatment, heat treatment would preferably be carried out at high temperatures for a long period of time. However, it should be borne in mind that the decomposition temperatures of $MoS_2$ and $WS_2$, for example, are 317° C. and 500° C. respectively. Thus the temperature at which the compacted powder material is subjected to heat treatment should essentially be below these decomposition temperatures. In addition, in cases where the amount of low melting point material additive is large, the additive may melt and flow out if the temperature is too high. Thus the temperature for heat treatment should be at a level at which this phenomenon can be avoided.

(3) The extrusion step may be either a cold extrusion or a hot extrusion. However, in cases where the low melting point material additive exceeds 20% by weight of the compacted powder material, cracks may be formed or the low melting point material additive may melt and flow out when the hot extrusion step is used. Thus in such cases, cold extrusion should be adopted.

(4) Heat treatment to which the extruded material is subjected is also an important process step of the method according to the invention. This heat treatment step is intended to further strengthen the bond between the particles and promote metallization. This heat treatment step contributes to increased percentage of elongation of the bearing material. The numerals in parentheses for the percentages of elongation of specimens Nos. 1, 3, 4 and 8 shown in the table at the end of this specification represent the results of experiments conducted on the bearing material produced by dispensing with the heat treatment step following the compacting step and the heat treatment step following the extrusion step. It will be seen that the specimens have lower percentages of elongation than the specimens subjected to the aforesaid two heat treatment steps. It will be presumed that the same applies to specimens Nos. 2, 5, 6, 7, 9 and 10. With regard to the atmosphere in which heat treatment is effected, experiments were conducted on heat treatment in cracked $NH_3$ gas atmosphere, in $N_2$ gas atmosphere and in the air. It has been ascertained that differences in atmosphere have no appreciable effects on the characteristics of the produced bearing material.

(5) In the rolling step, the extruded material has its thickness reduced by rolling. However, the rolling step may be dispensed with if the desired dimensions can be given to the bearing material by extrusion alone.

(6) It is not essential that the steel strip be of low carbon steel. Depending on the use to which the bearing material is put, not only a strip of special steel, such as stainless steel, high tension steel and so on, but also cut sheets of such steel may be used. As subsequently to be described, the steel strip may be plated with nickel (Ni) or cobalt (Co).

(7) It is not essential that degreasing be effected by means of a degreasing tank filled with trichloroethylene gas. Degreasing may be effected by using any other known cleaning agent.

(8) The means for polishing the surface to be bonded is not limited to a wire brush, and any other known means, such as shot blasts, may be used instead.

(9) Degreasing by means of a degreasing tank and polishing by means of a wire brush may be carried out beforehand in separate lines for a steel strip and a single or composite aluminum alloy material to be bonded to the steel strip. Also, either degreasing or polishing by means of a wire brush carried out for the steel strip may be dispensed with. For example, degreasing by means of a degreasing tank may be dispensed with for a steel strip immediately after having been plated with Ni.

(10) Pure aluminum is the most preferred material for a bonding layer when affinity in bonding with respect to a steel strip is considered. However, Cu, Ni, Si or Mg may be added to pure aluminum when it is desired to increase the strength of the bonding layer. In this connection, direction is drawn to the description in parenthesis made by referring to Example 2 when the bonding layer material 5 is explained.

(11) The steel strip and the single or composite material bonded to the steel strip at the rolling mill $R_2$ are generally bonded to each other by effecting cold rolling at a rolling reduction of 30–50%. To reduce the pass of rolling reduction, roll bonding may be effected by warm or hot rolling.

(12) The reasons why the temperature range for effecting heat treatment by means of the heat treating furnace H in the heat treatment step 204 in Example 2 is limited to between 200 and 520° C. are as follows. When the temperature is below 200° C., no satisfactory diffusion is obtained and bonding strength is low. On the other hand, when the temperature exceeds 520° C., activation is so excessive that the steel material or plating and Al or aluminum alloy react with each other to produce a brittle intermetallic compound. Of course, this problem could not be solved satisfactorily unless the interrelationship between temperature and time is considered in effecting heat treatment, and it would be meaningless to place limitations on the temperature alone. Let us consider the case of using a steel sheet having no plating applied thereto. When the temperature essentially exceeds 460° C. after heating the composite material for one hour, a brittle compound, such as $Fe_2Al_5$, is produced and the bonding strength is further reduced. On the other hand, when the steel sheet used has a Ni plating applied thereto, no marked growth of an intermetallic compound of high brittleness occurs and the bonding strength can be kept at a high level if the temperature is kept below 520° C. even if the temperature essentially exceeds 460° C. after heating for one hour. The reasons why the temperature for heat treatment is limited to the range between 200° and 520° C. are as described hereinabove. It is preferred that heat treatment be carried out by selecting a suitable temperature from this range, so that heat treatment can be effected satisfactorily.

(13) As a modification of the bearing material produced as described by referring to Example 2, multilayer bearing material, such as double-layer or bimetal bearing material consisting of a first bearing layer and a second bearing layer, for example, which is formed by the extrusion working without requiring a steel backing layer and a bonding layer can be produced.

Also, triple-layer bearing material (trimetal material) consisting of a steel backing layer, a first bearing layer and a second bearing layer can also be produced.

(14) In Examples 1 and 2, a powder mixture has been described as being used. However, when an alloy powder of the desired composition is readily obtainable, the mixing steps 100 and 200 may be dispensed with.

(15) When the bonding layer and the bearing layer are simultaneously extruded (See FIG. 6), the bonding surfaces of the bonding layer and the bearing layer are preferably treated by means of passing through a degreasing tank and/or by a wire brush, for example, to effect cleaning thereof.

The structures of various forms of bearing material produced by the method according to the invention described hereinabove will be described by referring to FIGS. 10–13.

FIG. 10 shows the structure of single bearing material of aluminum base containing a variety of additives. When multi-layer bearing material is produced by using such single bearing material, it is necessary to provide the bonding layer 51 shown in FIGS. 12 and 13, to obtain tight bonding with respect to the steel strip 7 (steel backing layer), for example.

The aforesaid additives may include the following:

Low melting point metallic lubricant, such as Pb, Sn and alloys thereof;

Solid lubricant, such as graphite, metal sulfides, metal oxides, metal fluorides, etc.;

Plastics, such as polytetrafluroethylene, polyimides, etc.; and

Element for strengthening aluminum matrix, such as Cu, Ni, Si, Mg, Zn, etc. Of these additives, low melting point metallic lubricant, solid lubricant and plastics are used as lubricant additives.

The proportion of the lubricant additive in total may be in the range between 0.5 and 40 weight percent consisting of at least one material selected from the three groups described hereinabove. The proportion of the aluminum strengthening agent may be in the range between 0.1 and 20 weight percent, when necessary. When the total amount of the lubricant additive in the bearing layer 11, namely, that of the low melting point metallic lubricant, solid lubricant and plastics exceeds 40 weight percent in total, the mechanical properties of the bearing metal 11 is so deteriorated that the bearing layer 11 becomes not suitable for practical use. The reason why the lower limit is set at 0.5 weight percent is that if the amount is lower than that, no effect of addition can be achieved.

The bonding layer 51 is characterized in that it consists solely of Al or contains Al as its main constituent and it contains a lubricant additive of a weight percent smaller than the weight percent of the lubricant additive contained in the bearing layer 11.

When the proportion of aluminum strengthening agent is less than 0.1 weight percent, no effect of additive can be achieved. When it exceeds 20 weight percent, the bearing material becomes too brittle to be of any practical use. The metal sulfide may be $MoS_2$, $WS_2$ and PbS, and metal oxide may be of PbO, $Pb_3O_4$, $TiO_2$ CdO, etc. The metal fluoride may be $CdF_2$, $PbF_2$, etc.

Figure 11:
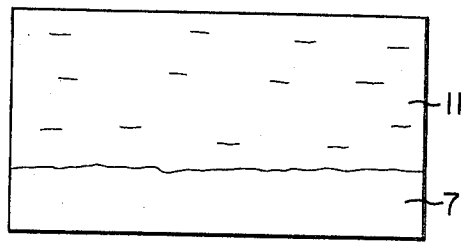

FIG. 11 shows in cross section the structure of a so-called double-layer bearing (bimetal strip) produced by superposing the steel strip 7 and a single extruded material of low lubricant additive one over the other without using the bonding layer 51 and pressing them against each other to provide a tight bond therebetween.

Figure 13:
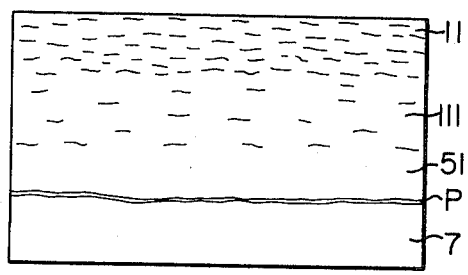

FIG. 13 shows a modification of the bearing material shown in FIG. 12 and the symbol P designates a plating layer of Ni. The bonding layer 51 may be a layer of extruded, cast or wrought material or a layer of extruded powder. The first bearing layer 111 and second bearing layer 11 are both layers of extruded powder. The bearing material shown in FIG. 13 having two bearing layers separate from each other is intended to provide bearing material of the type having improved compatibility and anti-seizure property. The lubricant additive (which is selected from the groups of low melting point metallic lubricant, solid lubricant, and plastics) contained in the second bearing layer 11 is higher in proportion than that contained in the first bearing layer 111. The proportion of the lubricant additive contained in the bonding layer 51 is lower than that contained in the first bearing layer 111, or the bonding layer 51 contains no additive at all. Thus the bearing material is constructed such that in use the first bearing layer 111 serves to journally receive a load and the second bearing layer 11 functions to provide for initial compatibility and anti-seizure property. The bonding layer 51 has the function of firmly bonding the first bearing layer 111 to the steel strip backing 7.

Figure 20:
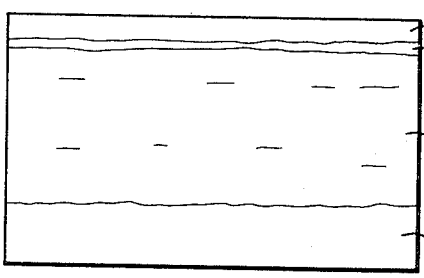
FIGS. 20-22 are sectional views (models) of the structures of the forms of the bearing material shown in FIGS. 11-13, respectively, to which a plating and an overlay are applied.
Figure 21:
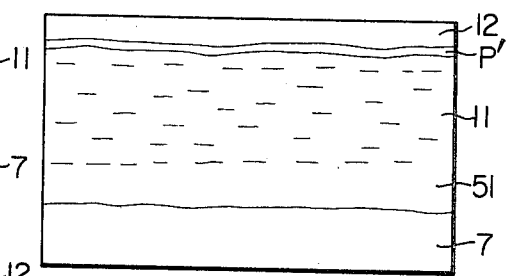
Figure 22:
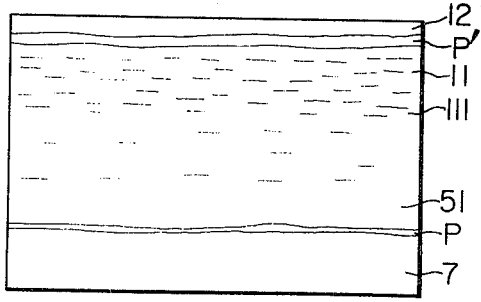

FIGS. 20–22 show in cross section of some models of the structures of multi-layer bearing material including a plating layer P′ formed on the bearing material layer 11 shown in FIGS. 11–13 respectively, and an overlay 12 applied by electrolytic plating to the surface of the plating layer P′. The plating layer P′ may be formed of any desired metal, such as Ni, Cu, etc. In some applications, the plating layer P′ may be dispensed with. The overlay 12 may be formed of any desired Pb base alloys, such as an alloy containing 10% Sn and the balance Pb, an alloy containing 3%, Cu, 8% Sn and the balance Pb, etc. Essentially, an overlay of a soft alloy is advantageously applied to the surface of the bearing material to improve the surface characteristic thereof which is necessary as slide bearing.

As aforesaid, FIGS. 17 and 18 show in cross section models of the structures of the material provided by the inventions of the prior applications which correspond to the structures of the bearing material according to the present invention shown in FIGS. 12 and 13 respectively. FIG. 19 shows the structure of the bearing material of the invention of the prior application corresponding to the structure of the bearing material according to the present invention shown in FIG. 16.

FIGS. 14–16 are micrographs of the present applications corresponding to FIGS. 10–12 of the present invention. In all of these micrographs, it will be clearly seen, in the present invention, that the additives are distributed more uniformly in fine particles of smaller size than in the prior applications.

From the foregoing description, it will be appreciated that the bearing material produced by the method according to the present invention has its additives distrubuted more uniformly as fine particles of smaller size than the bearing material provided by the prior applications, and the percentage of elongation is higher in the former than in the latter. This makes the method according to the invention particularly suitable for producing bearing material of large thickness.

TABLE

| Specimen No. | | Ingredients (wt %) | | | | | Additives | | | | | | Mechanical Properties | | | Remarks |
|---|---|---|---|---|---|---|---|---|---|---|---|---|---|---|---|---|
| | Al | Cu | Si | Zn | Sn | Pb | Graphite | MoS₂ | PbO | PbF₂ | WS₂ | Polyimide | Tensile Strength (kg/mm²) | Elongation Percentage (%) | Hardness (Hv5) | |
| Material of This Invention 1 | Bal. | 0.8 | 3.0 | 3.5 | 0.07 | 1.0 | — | — | — | — | — | — | 17.1 | 28.0 (15.1) | 46.1 | FIG. 15 |
| 2 | " | 0.6 | 2.9 | — | 0.35 | 5.0 | — | — | — | — | — | — | 14.8 | 22.2 | 41.9 | |
| 3 | " | 0.6 | 2.9 | — | 0.7 | 10.0 | — | — | — | — | — | — | 14.4 | 20.1 (12.2) | 40.4 | |
| 4 | " | 0.6 | 2.9 | — | 1.0 | 14.0 | — | — | — | — | — | — | 14.7 | 18.5 (10.5) | 41.0 | FIGS. 14, 16 |
| 5 | " | 0.6 | 2.9 | — | — | — | 5.0 | — | — | — | — | — | 14.1 | 5.3 | 40.2 | |
| 6 | " | 3.0 | 10.0 | — | — | — | 5.0 | — | — | — | — | — | 20.3 | 2.6 | 66.2 | |
| 7 | " | 0.6 | 2.9 | — | — | — | — | 5.0 | — | — | — | — | 15.6 | 5.2 | 51.7 | |
| 8 | " | 0.6 | 2.9 | — | — | — | — | — | 15.0 | — | — | — | 16.4 | 10.6 (5.7) | 47.0 | |
| 9 | " | 0.6 | 2.9 | — | — | — | — | — | — | 10.0 | — | — | 14.7 | 11.6 | 44.5 | |
| 10 | " | — | — | — | 1.0 | 18.8 | — | — | — | — | — | — | 10.1 | 20.0 | 29.1 | |
| 11 | " | 0.6 | 2.9 | — | 1.0 | 14.0 | — | — | 20.0 | — | — | — | 13.1 | 3.8 | 45.5 | |
| 12 | " | 0.6 | 2.9 | — | — | — | — | — | 20.0 | — | — | — | 16.7 | 10.5 | 48.9 | |
| 13 | " | 0.6 | 2.9 | — | 0.7 | 10.0 | — | — | 15.0 | — | 10.0 | — | 12.2 | 2.4 | 45.2 | |
| 14 | " | 0.6 | 2.9 | — | — | — | — | — | 20.0 | 5.0 | 10.0 | — | 11.0 | 2.3 | 47.0 | |
| 15 | " | — | — | — | — | — | — | — | — | — | — | 5.0 | 10.5 | 2.0 | 37.5 | |
| Material of prior Application 16 | " | 0.6 | 2.9 | — | 1.0 | 14.0 | — | — | — | — | — | — | 14.6 | 5.0 | 45.3 | FIG. 19 |

I claim:

1. A method of producing powdered and extruded single layer bearing material containing Al as its main component, comprising the steps of:
   mixing powdered materials to form a powder mixture comprising 0.5–40 wt% in total of at least one type of lubricant additive selected from the group consisting of low melting-point metal lubricants, solid lubricants, and plastics, and the balance Al and inevitable impurities;
   compacting the mixed powder to a desired shape;
   subjecting the shaped material to heat treatment at a temperature below the temperature for initiating solidification of a bearing material;
   extruding the heat-treated, shaped material;
   subjecting the extruded material to a second heat treatment at a temperature below the solidification initiating temperature of the beaaring material; and
   rolling the heat-treated material, when necessary.

2. A method as claimed in claim 1, wherein said mixed powder and/or alloy powder is further added with
   0.1–20 wt% in total of at least one type of additives for increasing the strength of Al selected from the group consisting of Cu, Ni, Si, Mg and Zn.

3. A method as claimed in claim 1 wherein said low melting point metal lubricant is selected from the group consisting of Pb, Sn and alloys or mixtures thereof; said solid lubricants are selected from the group consisting of graphite, metal sulfides, metal oxides and metal fluorides; and said plastics are selected from the group consisting of polytetrafluoroethylene and polyimides.

4. A method of producing powdered and extruded composite bearing material containing Al as its main component comprising the steps of:
   mixing powdered materials to form a second powder mixture containing 0.5–40 wt% in total of at least one type of lubricant additive selected from the group consisting of low melting-point metal lubricants, solid lubricants, and plastics, and the balance Al and inevitable impurities;
   mixing powdered materials to form a first powder mixture containing primarily Al and lubricant additives in an amount smaller than that of the lubricant additive of the second powder mixture;
   forming a first bearing layer from the first powder mixture and a second bearing layer from the second powder mixture
   compacting said first bearing layer and said second bearing layer into a desired shape or each into an individual shape;
   subjecting the shaped material to a first heat treatment at a temperature below the temperature for initiating solidification of the bearing material;
   extruding the heat-treated, shaped material;
   subjecting the extruded material to a second heat treatment at a temperature below the temperature for initiating solidification of the bearing material; and
   rolling the heat-treated material, when necessary.

5. A method as claimed in claim 4, wherein the powder for forming said first bearing layer and/or said second bearing layer is further added with
   0.1–20 wt% in total of one type or more than two types of additives for increasing the strength of Al selected from the group consisting of Cu, Ni, Si, Mg and Zn.

6. A method as claimed in claim 4 wherein said low melting point metal lubricant is selected from the group consisting of Pb, Sn and alloys or mixtures thereof; said solid lubricants are selected from the group consisting of graphite, metal sulfides, metal oxides and metal fluorides; and said plastics are selected from the group consisting of polytetrafluoroethylene and polyimides.

7. A method of producing powdered and extruded composite bearing material containing Al as its main component for producing a bearing, comprising the steps of:
   mixing powdered materials to form a second powdered mixture comprising 0.5–40 wt% in total of at least one type of lubricant additive selected from the group consisting of low melting-point metal lubricants, solid lubricants, and plastics, and the balance Al and inevitable impurities;

mixing powdered materials to form a first powdered mixture containing a lubricant additive in an amount smaller than that of the lubricant additive of the second powdered mixture forming a first bearing layer form the first powdered mixture a second bearing layer from the second powdered mixture;

arranging a powdered Al or Al alloy layer as a bonding or adhesive layer in such a manner that said adhesive layer is in contact with the other face of said first bearing layer;

compacting said arranged three layers into a desired shape;

subjecting the shaped material to a first heat treatment at a temperature below the temperature for initiating solidification of the bearing material;

extruding the heat-treated, shaped material;

subjecting the extruded material to a second heat treatment at a temperature below the temperature for initiating solidification of the bearing material; and rolling the heat-treated material, when necessary.

8. A method as claimed in claim 7, wherein the bonding layer, first bearing layer and/or the second bearing layer is further added with 0.1–20 wt% in total of at least one additive for increasing the strength of Al selected from the group consisting of Cu, Ni, Si, Mg and Zn.

9. A method according to claim 7, wherein said bonding layer is formed of wrought or cast aluminum or aluminum alloy and is stacked on said compacted and heat-treated first and second bearing layers and then subjected to said extrusion.

10. A method of producing powdered and extruded composite bearing material containing Al as its main component comprising the steps of:

mixing powdered materials to form a bearing metal layer comprising 0.5–40 wt% in total of at least one type of lubricant additive selected from the group consisting of low melting-point metal lubricants, solid lubricants, and plastics, and the balance Al and incidental impurities;

preparing powdered Al or Al alloy layer;

compacting said two layers into a desired shape or each individually into a desired shape;

subjecting the thus shaped material to a first heat treatment at a temperature below the temperature for initiating solidification of the bearing material;

extruding the heat-treated, shaped material;

subjecting the extruded material to a second heat treatment at a temperature below the temperature for initiating solidification of the bearing material; and rolling the extruded material, when necessary.

11. A method as claimed in claim 10, wherein the bonding layer and/or powder mixture for the bearing layer is further added with 0.1–20 wt% in total of at least one additive for increasing the strength of Al selected from the group consisting of Cu, Ni, Si, Mg and Zn.

12. A method in accordance with claim 10, wherein said bonding layer is formed of wrought or cast aluminum or aluminum alloy and stacked on said compacted and heat-treated bearing layer and then subjected to said extrusion.

* * * * *

UNITED STATES PATENT OFFICE
CERTIFICATE OF CORRECTION

Patent No. 4,361,629            Dated November 30, 1982

Inventor(s) Sanae MORI

It is certified that error appears in the above-identified patent and that said Letters Patent are hereby corrected as shown below:

On Sheet 1 of the drawings, replace Fig. 2 with the following Fig. 2:

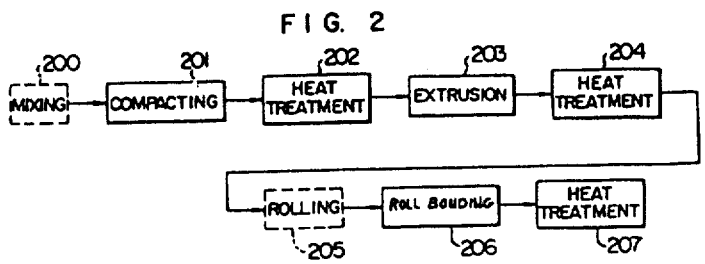

FIG. 2

Signed and Sealed this

Sixth Day of September 1983

[SEAL]

Attest:

Attesting Officer

GERALD J. MOSSINGHOFF
Commissioner of Patents and Trademarks